(12) United States Patent
Krishna Rao et al.

(10) Patent No.: US 11,144,832 B2
(45) Date of Patent: Oct. 12, 2021

(54) SYSTEM AND METHOD FOR DETERMINING OPTIMAL SOLUTION IN A SWARM OF SOLUTIONS USING SWARM INTELLIGENCE

(71) Applicant: Cognizant Technology Solutions India Pvt. Ltd., Chennai (IN)

(72) Inventors: Geelapaturu Subrahmanya Venkata Radha Krishna Rao, Chennai (IN); Gangadharan Ramakrishnan Gangadharan, Tirunelveli District (IN); Dinesh Reddy Vemula, Warangal (IN)

(73) Assignee: COGNIZANT TECHNOLOGY SOLUTIONS INDIA PVT. LTD, Chennai (IN)

( * ) Notice: Subject to any disclaimer, the term of this patent is extended or adjusted under 35 U.S.C. 154(b) by 935 days.

(21) Appl. No.: 15/877,843

(22) Filed: Jan. 23, 2018

(65) Prior Publication Data

US 2019/0138910 A1    May 9, 2019

(30) Foreign Application Priority Data

Nov. 3, 2017    (IN) ............................. 201741039296

(51) Int. Cl.
*G11C 11/00*    (2006.01)
*F41G 7/22*    (2006.01)
(Continued)

(52) U.S. Cl.
CPC ............. *G06N 3/126* (2013.01); *G06N 20/00* (2019.01); *G06F 17/12* (2013.01); *G06F 17/16* (2013.01); *G06F 17/175* (2013.01)

(58) Field of Classification Search
CPC ........ G06N 3/126; G06N 20/00; G06F 17/12; G06F 17/175; G06F 17/16
(Continued)

(56) References Cited

U.S. PATENT DOCUMENTS

| | | | |
|---|---|---|---|
| 8,213,709 B1 * | 7/2012 | Medasani | ............ G06K 9/6278 |
| | | | 382/155 |
| 2007/0019865 A1 * | 1/2007 | Owechko | ............. G06K 9/6229 |
| | | | 382/224 |

(Continued)

OTHER PUBLICATIONS

Changhe Li, "A Self-Learning Particle Swarm Optimizer for Global Optimization Problems", IEEE Transactions on Systems, Man, and Cybernetics—Part B: Cybernetics, vol. 42, No. 3, Jun. 2012.
(Continued)

*Primary Examiner* — Brandon S Cole
(74) *Attorney, Agent, or Firm* — Cantor Colburn LLP

(57) ABSTRACT

A system and method for determining an optimal solution to an optimization problem in a swarm of candidate solutions is provided. The invention comprises generating a population of random particles, where each particle is representative of a candidate solution. Further, a best particle is identified from the generated population of particles. The best particle is representative of an optimal solution. The population of particles is categorised into similar and non-similar particle groups by applying one or more multivariate measurement techniques, and similarity between the particles of the non-similar particle group with best particle is updated by applying an imitation technique. The generated population is updated with updated particles and a new best particle is evaluated from said population. Furthermore, final best particle is determined by further updating the population of particles until one or more target conditions are achieved.

23 Claims, 3 Drawing Sheets

(51) Int. Cl.
*G06N 3/12* (2006.01)
*G06N 20/00* (2019.01)
*G06F 17/17* (2006.01)
*G06F 17/12* (2006.01)
*G06F 17/16* (2006.01)

(58) Field of Classification Search
USPC ........................................................ 706/1–62
See application file for complete search history.

(56) References Cited

U.S. PATENT DOCUMENTS

| | | | | | |
|---|---|---|---|---|---|
| 2012/0053764 | A1* | 3/2012 | Omar | .................... | G05D 1/107 |
| | | | | | 701/13 |
| 2013/0153707 | A1* | 6/2013 | Gate | ........................ | F41G 7/22 |
| | | | | | 244/3.15 |
| 2013/0181642 | A1 | 7/2013 | Khan | | |
| 2015/0106323 | A1* | 4/2015 | Awotunde | ............. | G06N 3/006 |
| | | | | | 706/52 |
| 2015/0202990 | A1* | 7/2015 | Grossard | ................ | G06Q 50/30 |
| | | | | | 701/22 |
| 2015/0310162 | A1* | 10/2015 | Okuno | ................... | G16C 20/50 |
| | | | | | 706/12 |
| 2018/0082198 | A1* | 3/2018 | Thompson | ............. | G06N 3/126 |

OTHER PUBLICATIONS

Julfikar Islam, "A comparative study on prominent nature inspired algorithms for function optimization", Retrieved from Internet, URL https://www.researchgate.netpublication/311757332_A_comparative_study_on_prominent_nature_inspired_algorithms_for_function_optimization, 2016.

Nosratallah Forghani, "Application of Particle Swarm Optimization in Accurate Segmentation of Brain MR Images", Retrieved from Internet, URL: http://cdn.intechweb.org/pdfs/6262.pdf , 2009.

PSO Tutorial, 2006, Retrieved from Internet, URL: http://www.swarmintelligence.org/tutorials.php.

* cited by examiner

SYSTEM AND METHOD FOR DETERMINING OPTIMAL SOLUTION IN A SWARM OF SOLUTIONS USING SWARM INTELLIGENCE

FIELD OF THE INVENTION

The present invention relates generally to the field of swarm optimization and evolutionary computing. More particularly, the present invention relates to a system and a method for determining an optimal solution representing a best particle in a swarm of particles for effectively solving optimization problems associated with various applications.

BACKGROUND OF THE INVENTION

Swarm intelligence is an evolutionary approach and a subset of artificial intelligence, wherein many decentralized individuals combine thoughts to learn from their surroundings and nature. Swarm optimization has a multidisciplinary character derived from collective behavior of a self-organized and decentralized group of individuals. The swarm environment is self-organized and populated by particles having the goal of achieving optimal solution.

Most of the existing optimization techniques, attempt to minimize or maximize a function of a defined domain by systematically choosing input values from within an allowed set and computing the value of the function to solve an optimization problem. However, there exists certain optimization problems that involve application of for instance heuristics or meta-heuristics. In these techniques heuristic functions are used to guide the process of finding global optimal solution in a search space, in a manner similar to a human. This search process can be strategic or unsystematic.

Further, meta-heuristic techniques are based on natural phenomenon and uses heuristic function strategically to solve hard global continuous or discrete optimization problems. Some examples of techniques as described above, derived on the basis of some of natural phenomenon include particle swarm optimization (PSO), ant colony optimization (ACO), etc. However, the existing techniques provide sub-optimal convergence and have been observed to lack consistency. Further, the existing techniques lack desirable diversification. Yet further, the existing techniques are tuned by trial and error and involves complexity in setting operational parameters. Furthermore, exploration of search space is experimental in these techniques rather than based on theory and hence the outcome may lack accuracy. Also, it has been observed that in certain existing techniques, the encoding scheme has to be defined if non-real-valued decision variables are present in a problem which may result in increased complexity.

In light of the above drawbacks, there is a need for a system and a method which provides optimal solutions in a swarm of solutions with fast convergence. There is a need for a system and method which provides for evolution of solutions in the swarm with respect to an optimal solution. There is also a need for a system and a method which maximizes success rate of the optimal solution. Further, there is a need for a system and a method which solves complex optimization problems effectively and efficiently.

SUMMARY OF THE INVENTION

A method for determining an optimal solution to an optimization problem from a swarm of candidate solutions is provided. In various embodiments of the present invention, the method is performed by an optimization engine. The optimization engine executes instructions stored in a memory via a processor. The method comprises generating, by the optimization engine, a population of particles in a search-space for an optimization problem based on a first set of rules. Each particle is representative of a candidate solution. The method further comprises evaluating, by the optimization engine, a best particle from the generated population of random particles based on a second set of rules. The best particle is representative of an optimal solution. Further, the method comprises converting, by the optimization engine, each particle from the generated population into a datatype compatible for further processing by one or more multivariate measurement techniques and an imitation technique. Furthermore, the method comprises categorizing, by the optimization engine, the generated population of particles into similar and non-similar particle groups based on similarity with the best particle by applying one or more multivariate measurement techniques. The method further comprises updating, by the optimization engine, each particle of the non-similar particle group with respect to the best particle by applying the imitation technique. Further, the method comprises updating, by the optimization engine, the generated population of particles with at least one of: one or more updated particles of the non-similar particle group and one or more randomly generated new particles. The any one or more of the updated particles is replaced with respective randomly generated new particles if degree of similarity of the any one or more of the updated particles in relation to the best particle is less than the respective randomly generated new particles. Furthermore, the method comprises evaluating, by the optimization engine, a new best particle from updated population of particles based on the second set of rules. Yet further, the method comprises determining, by the optimization engine, if at least one condition from a set of target-conditions has been achieved and selecting the particle with highest solving value in last updated population of particles as final best particle. Finally, the method comprises repeating steps of converting into a datatype, categorizing into similar and non-similar particle groups, updating each particle of non-similar particle group, updating generated population of particles and evaluating new best particle until at least one of the target conditions is achieved.

An optimization system for determining an optimal solution to an optimization problem in a swarm of candidate solutions is provided. In various embodiments of the present invention, the optimization system comprises a memory storing program instructions, a processor configured to execute program instructions stored in the memory, and an optimization engine in communication with the processor. The optimization engine configured to generate a population of particles in a search-space for an optimization problem based on a first set of rules. Each particle is representative of a candidate solution. The optimization engine evaluates a best particle from the generated population of random particles based on a second set of rules. The best particle is representative of an optimal solution. Further, the optimization engine converts each particle from the generated population into a datatype compatible for further processing by one or more multivariate measurement techniques and an imitation technique. Furthermore, the optimization engine categorizes the generated population of particles into similar and non-similar particle groups based on similarity with the best particle by applying one or more multivariate measurement techniques. The optimization engine, further updates each particle of the non-similar particle group with respect to the best particle by applying the imitation technique. Furthermore, the optimization engine updates the generated population of particles with at least one of: one or more updated particles of the non-similar particle group and one or more randomly generated new particles. The any one or more of the updated particles is replaced with respective randomly generated new particles if degree of similarity of the any one or more of the updated particles in relation to the best particle is less than the respective randomly generated new particles. Furthermore, the optimization engine evaluates a new best particle from updated population of particles based on the second set of rules. Yet further, the optimization engine determines if at least one condition from a set of target conditions has been achieved. The optimization engine selects the particle with highest solving value in last updated population of particles as final best particle. Finally, the optimization engine repeats the steps of converting into a datatype, categorizing into similar and non-similar particle groups, updating each particle of non-similar particle group, updating generated population of particles and evaluating new best particle until at least one of the target conditions is achieved.

A computer program product is provided. The computer program product comprises a non-transitory computer-readable medium having computer-readable program code stored thereon, the computer-readable program code comprising instructions that, when executed by a processor, cause the processor to generate a population of particles in a search-space for an optimization problem based on a first set of rules. Each particle is representative of a candidate solution. Further a best particle from the generated population of random particles based on a second set of rules is evaluated. The best particle is representative of an optimal solution. Further, each particle from the generated population is converted into a datatype compatible for further processing by one or more multivariate measurement techniques and an imitation technique. Furthermore, the generated population of particles is categorized into similar and non-similar particle groups based on similarity with the best particle by applying one or more multivariate measurement techniques. Furthermore, each particle of the non-similar particle group with respect to the best particle is updated by applying the imitation technique. Furthermore, the generated population of particles is updated with at least one of: one or more updated particles of the non-similar particle group and one or more randomly generated new particles. The any one or more of the updated particles is replaced with respective randomly generated new particles if degree of similarity of the any one or more of the updated particles in relation to the best particle is less than the respective randomly generated new particles. Furthermore, a new best particle from updated population of particles is evaluated based on the second set of rules. Yet further, it is determined if at least one condition from a set of target conditions has been achieved. The particle with the highest solving value in last updated population of particles is selected as final best particle. Finally, the steps of converting into a datatype, categorizing into similar and non-similar particle groups, updating each particle of non-similar particle group, updating generated population of particles and evaluating new best particle are repeated, until at least one of the target conditions is achieved.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for determining an optimal solution to an optimization problem in a swarm of candidate solutions by applying an imitation technique. In particular, the present invention provides for generating a population of random particles. Each particle is representative of a candidate solution. Further, the present invention provides for identifying best particle from the generated population of particles. The best particle is representative of an optimal solution. Further, the present invention provides for categorising the population of particles into similar and non-similar particle groups based on the similarity with the best particle by applying one or more multivariate measurement techniques, updating the similarity between the particles of the non-similar particle group with the best particle by applying an imitation technique, updating the generated population with the updated particles of the non-similar particle group, evaluating best particle from the updated population and comparing with previous best. Yet further, the present invention provides for determining the final best particle by updating the population of particles, applying the multivariate measurement techniques and imitation techniques until one or more target conditions are fulfilled. The present invention may be utilized in a variety of applications where multiple solutions exists and an optimal solution is required based on the available resources, for example: engineering design problems, load balancing further comprising network load balancing, processor load balancing and cellular antenna load balancing; etc.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
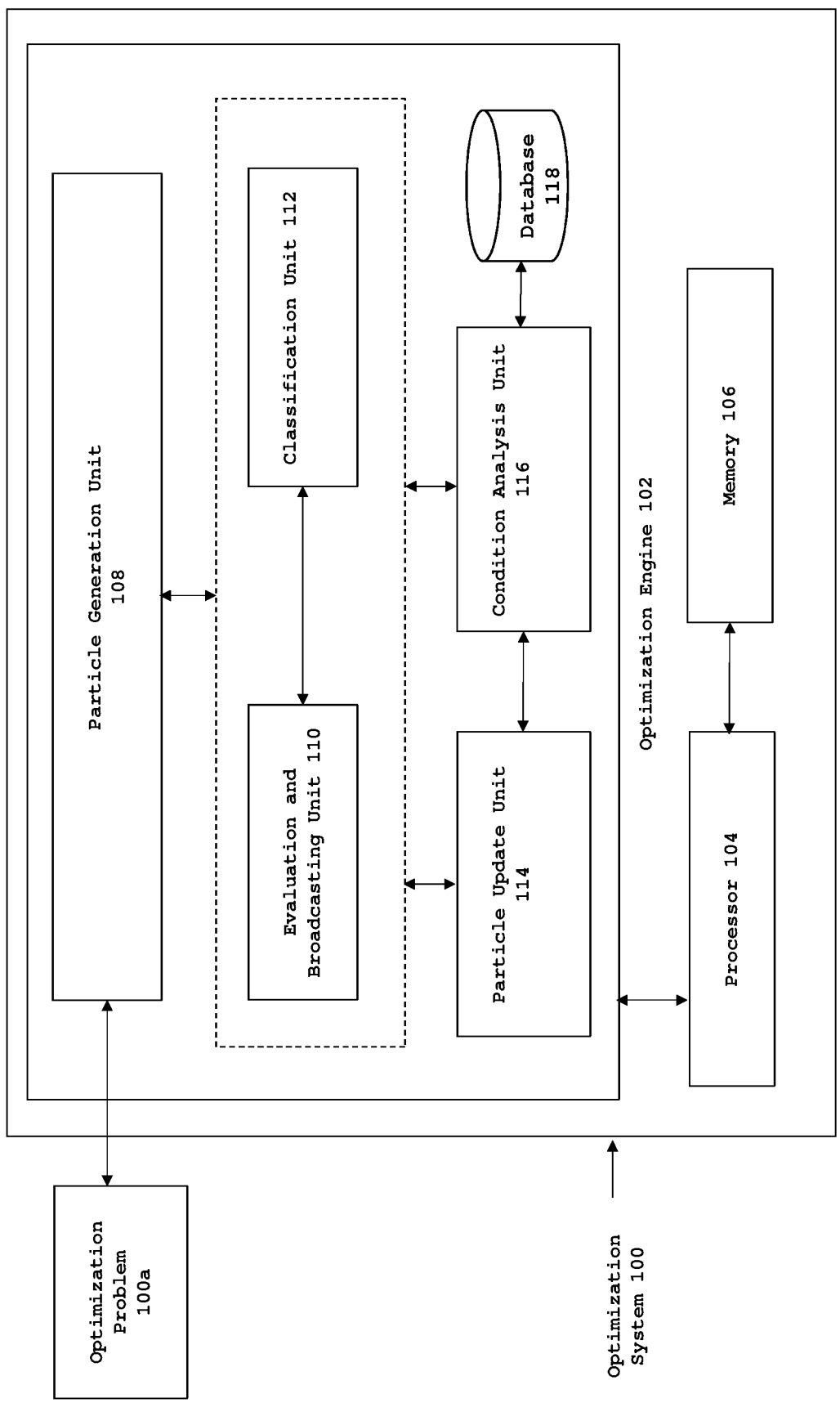
FIG. 1 is a detailed block diagram of an optimization system for determining an optimal solution to an optimization problem in a swarm of candidate solutions, in accordance with various embodiments of the present invention.

FIG. 1 is a detailed block diagram of an optimization system for determining an optimal solution to an optimization problem in a swarm of candidate solutions, in accordance with various embodiments of the present invention.

The optimization system 100 comprises an optimization engine 102, a processor 104 and a memory 106. The optimization engine 102 is a self-learning engine configured to automatically generate a swarm of particles representative of swarm of candidate solutions, analyze particles, categorize particles, update particles and determine the best particle. The optimization engine 102 has multiple units which work in conjunction with each other for determining an optimal solution to an optimization problem in a swarm of candidate solutions. The various units of the optimization engine 102 are operated via the processor 104 specifically programmed to execute instructions stored in the memory 106 for executing respective functionalities of the units of the system 100 in accordance with various embodiments of the present invention.

In another embodiment of the present invention, the system 100 may be implemented in a cloud computing architecture in which data, applications, services, and other resources are stored and delivered through shared datacenters. In an exemplary embodiment of the present invention, the functionalities of the system 100 are delivered to a user as software as a service (SAAS) over a communication network.

In another embodiment of the present invention, the system 100 may be implemented as a client-server architecture. In said embodiment of the present invention, a client terminal accesses a server hosting the system 100 over a communication network. The client terminals may include but are not limited to a smart phone, a computer, a tablet, microcomputer or any other wired or wireless terminal. The server may be a centralized or a decentralized server.

In an embodiment of the present invention, the optimization engine 102 comprises a particle generation unit 108, an evaluation and broadcasting unit 110, a classification unit 112, a particle update unit 114, a condition analysis unit 116 and a database 118.

The particle generation unit 108 is configured to receive an optimization problem from an input/output terminal 100a and generate a population of particles in response to said optimization problem in a search-space based on a first set rules. Each particle is representative of a candidate solution. Each optimization problem is associated with a set of conditions which must be satisfied to solve the optimization problem. In an exemplary embodiment of the present invention, the first set of rule comprises, generating a population of random particles which satisfy the conditions associated with the optimization problem to solve said problem with certain capability. Each particle has some random position in the search-space and has some level of capability to solve the optimization problem. The capability to solve the problem is hereinafter referred to as solving value.

In an exemplary embodiment of the present invention, the optimization problem is related to the field of engineering design. For instance the problem may pertain to evaluating optimal V0 is to be proportioned subject to the following condition: total cost of the material in a box of 12 cans, arranged in a 3×4 pattern should be minimized. Further, r≥0, h≥0, 8r≤D0, 6r≤D0, h≤D0, πr2 h=V0, where r denotes radius of a can, and h denotes height of the can.

The cost expression takes the form z1S1+z2S2, where S1 is the surface area of the 12 cans and S2 is the surface area of the box. The coefficients z1 and z2 are positive and may be generated based on a desired end requirement. For instance, in this case the end user requirement is cost and therefore z1 and z2 represent the cost of the material per unit area. Further the coefficients may be generated based on other end user requirements such as weight, speed, bandwidth, reliability etc. Further, a secondary condition is that no dimension of the box can exceed a given amount D0.

In this exemplary embodiment of the present invention, the particle generation unit 108 identifies the design parameters by analyzing the optimization problem. For instance the design parameters are r and h, where r denotes radius of a can, and h denotes height of the can.

Further, the particle generation unit 108 identifies the available design solutions as a set consisting of all pairs of variables (r, h) that satisfy the following conditions associated with the optimization problem:

r≥0, h≥0, 8r≤D0, 6r≤D0, h≤D0, πr2 h=V0

Further, the particle generation unit 108 generates a population of particles (r, h) as shown below satisfying the conditions as mentioned above.

$$\text{population of random particles} = \begin{bmatrix} r1 & h1 \\ r2 & h2 \\ r3 & h3 \\ \ldots & \\ \ldots & \\ rn & hn \end{bmatrix}$$

In an embodiment of the present invention, the evaluation and broadcasting unit 110 is configured to receive the generated population of particles from the particle generation unit 108. The evaluation and broadcasting unit 110 evaluates the best particle based on a second set of rules. The best particle is representative of an optimal solution. In an exemplary embodiment of the present invention, the second set of rules comprises evaluating and analyzing the solving value of each particle in the population and selecting the particle with the highest solving value as the best particle. Further, the evaluation and broadcasting unit 110 broadcasts the information with respect to the best particle to all other particles in the population.

For instance in the engineering design problem the evaluation and broadcasting unit 110, evaluates the particles which provide minimum total cost of the material in a box of 12 cans, arranged in a 3×4 pattern as exemplified below:

f0(r, h)=z1[24πr(r+h)]+z2[4r(24r+7h)], where f0(r, h) is a function denoting total cost. In an exemplary embodiment of the present invention, z1=1 and z2=2.

The evaluation and broadcasting unit 110 selects the particle which provides minimum value of the function f0(r, h) as the best particle. Further, the particle which provides minimum value of the function f0(r, h) has the highest solving value.

The classification unit 112 is configured to receive the generated population of particles and the evaluated best particle from the evaluation and broadcasting unit 110. The classification unit 112 converts each particle from the generated population into a datatype compatible for further processing by one or more multivariate measurement techniques and the imitation technique. In an exemplary embodiment of the present invention the data type is a matrix. Generation of matrix depends on the optimization problem. The classification unit 112 evaluates the number of variables in a particle of the generated population of particles. It must be understood that the variables of the particle are the design parameters (r, h) identified by the particle generation unit 108 by analyzing the optimization problem as already exemplified above. Further, it must be noted that the number of variables in each particle are the same. Further, the classification unit 112 evaluates the dimensions of the matrix based on the number of variables in the particle. In an embodiment of the present invention, the number of rows of the matrix is equivalent to the number of variables in the particle. Further, in said embodiment of the present invention the number of columns in the matrix are two. Yet further, a constant value is generated for first column based on the dimensions of the matrix, where the constant values are sequential integers. For example the first column in the matrix are sequential integers 1, 2 . . . n. Finally, the classification unit 112 selects the variables of the particle as second column of the matrix. In various embodiments of the present invention, the number of rows in the matrix increases with increase in the number of variables.

For example if the solution for a problem consists of only one variable (element) then the first column is generated as a constant value in all the matrices and random solutions generated by the particle generation unit 108 are selected as the second column. For instance: {(1, a1), (2, a2), (3, a3) . . . } where [a1, a2, a3 . . . ] represent the solution for a given problem.

In the exemplary embodiment of the present invention, as discussed above the optimization problem is related to the field of engineering design and has two variables r and h.

The population of particles as generated by the particle generation unit 108 is as follows:

$$\text{population of random particles} = \begin{bmatrix} r1 & h1 \\ r2 & h2 \\ r3 & h3 \\ \cdots & \\ \cdots & \\ rn & hn \end{bmatrix}$$

The evaluation and broadcasting unit 110, evaluates the best particle as discussed above. For instance, particle (r1, h1) is evaluated as the best particle. The classification unit 112 generates a matrix B1 from the selected best particle (r1, h1) as shown below:

$$B1 = \begin{bmatrix} 1 & r1 \\ 2 & h1 \end{bmatrix}$$

Further, the classification unit 112, selects each particle one by one, either randomly or in the order of their solving capability and generates respective matrices. For example, matrix A1 is generated from particle (r2,h2) as shown below:

$$A1 = \begin{bmatrix} 1 & r_2 \\ 2 & h_2 \end{bmatrix}$$

Further, the classification unit 112 categorizes the generated population of particles into similar and non-similar particle groups based on the similarity with the best particle by applying one or more multivariate measurement techniques. The examples of multivariate measurement techniques include but are not limited to Mahalanobis Distance (MD) and Euclidean distance techniques. In an exemplary embodiment of the present invention, the multivariate measurement technique is Mahalanobis.

The Mahalanobis Distance (MD) technique distinguishes the pattern of a certain group from other groups more efficiently. It is a distance measure based on correlations between variables by which different patterns can be identified and analyzed with respect to a reference baseline. The MD measure is used to determine the similarity of a set of values from an unknown sample to a set of values measured from a collection of known samples. One of the main applications of MD is to introduce a scale based on all characteristics to measure the degree of abnormality. It measures the distances in multi-dimensional spaces taking into account the correlations between variables or characteristics that may exist. When compared to other multivariate measurement techniques such as the Euclidean distance, MD is superior. The Euclidean distance, for instance, does not indicate the extent up to which the unknown data matches with the reference data and does not takes into account the distribution of the points (correlation).

The evaluation of similarity between a particle and the best particle is expressed in terms of Mahalanobis Distance (MD). Greater the value of Mahalanobis Distance (MD) between a particle and the best particle lesser is the similarity and the particle is grouped into non-similar particle group. Further, lesser is the value of Mahalanobis Distance between a particle and the best particle, greater is the similarity and the particle is grouped into similar particle group. The MD value is evaluated as exemplified below:

The classification unit 112 evaluates the mean vectors of the generated matrices. For instance, the classification unit 112 generates mean vectors Mean (A1) and Mean (B1) of the matrices A1 and B1 respectively.

Further, the classification unit 112 evaluates the centered data of the generated matrices. For instance, the classification unit 112 generates centered data matrices A' and B' of the matrices A1 and B1 respectively as exemplified below:

A'=A1−Mean (A1)
B'=B1−Mean (B1)

Yet further, the classification unit 112 evaluates the covariance matrices for the generated centered data matrices. For instance the classification unit 112 generates covariance matrices C1 and C2 for centered data matrices A' and B' respectively, as exemplified below:

$$C1 = \frac{1}{n1} * (A')^T * (A')$$

$$C2 = \frac{1}{n2} * (B')^T * (B')$$

where C1 and C2 are the covariance matrices evaluated from the matrices A' and B' respectively, n1 and n2 are the number of rows in the matrices A' and B' respectively.

Further, the classification unit 112 evaluates the pooled covariance matrix from each of the evaluated covariance matrices associated with the rest of the particles and the covariance matrix associated with the best particle. For instance, the classification unit 112 evaluates the pooled covariance matrix of C1 and C2 as exemplified below:

$$PC = \frac{1}{n1+n2}[n1*c1+n2*c2]$$

The classification unit 112, further evaluates the mean difference of each of the mean vector matrices from the mean vector matrix associated with the best particle. For instance the classification unit 112, further evaluates the mean difference matrix of matrices A1 and B1 as exemplified below:

$$B1 = \begin{bmatrix} 1 & r1 \\ 2 & h1 \end{bmatrix}, \text{Mean } B1 = [1.5 \; r1 + h1/2]$$

$$A1 = \begin{bmatrix} 1 & r2 \\ 2 & h2 \end{bmatrix}, \text{Mean } A1 = [1.5 \; r2 + h2/2]$$

Mean Difference=Mean B1−Mean A1=[x,y] (where x=0 and y has some value]

Finally, the classification unit 112 evaluates the Mahalanobis Distance (MD) as a function of pooled covariance matrix and mean difference, as exemplified below:

$$MD = \begin{cases} \sqrt{\text{Mean Difference} * PC^{-1} * \text{Mean Difference}^T} & \text{if inverse of } PC \text{ is possible} \\ 1 & \text{Otherwise} \end{cases}$$

For instance in the engineering design problem $$B1 \text{ (generated from best particle } (r1, h1)) = \begin{bmatrix} 1 & r1 \\ 2 & h1 \end{bmatrix}$$

$$A1 \text{ (generated from particle } (r2, h2) = \begin{bmatrix} 1 & r_2 \\ 2 & h_2 \end{bmatrix}$$

The classification unit 112 evaluates the Mahalnobis distance between A1 and B1. If the distance is less than desired similarity value ($\gamma$), then A1 is added to the similar particle group else A1 is added to the non-similar particle group. In an exemplary embodiment of the present invention, $\gamma<0.5$, however $\gamma$ may vary depending on the level of similarity desired. Further, the classification unit 112 evaluates Mahalanobis Distance (MD) for all the other particles in the generated population and categorizes the particles into similar and non-similar particle groups accordingly.

The particle update unit 114, is configured to receive the best particle, the particles in the non-similar particle group and the datatype generated from each particle of generated population of particles from the classification unit 112. Further, the particle update unit 114 updates each particle of the non-similar particle group with respect to the best particle by applying an imitation technique. In various embodiments of the present invention, the imitation technique is based on human behavior of learning and imitating to solve complex problems. The best particle is representative of a leader and the non-similar particles are representative of followers. The leader who has achieved good position in a society serves as an energizing force with associated position and collected experience to solve a problem. Complex problems can be solved with the influence of traits from one person to other or from one group to other groups in the society. It has been observed that human beings are great imitators or followers in solving any task. Group solving capability has emerged to be more effective than individual capability in exploiting and exploring different traits of each individual in the group to solve a given problem. The leader influences the others in processing critical situations. A leader's view of a complex situation can affect the follower's way to move forward. In particular, if a particular state of a particle is being rewarded then the movements of other particles are indirectly reinforced to imitate the state of the particle being rewarded. The other particles in the swarm starts imitating the best particle due to the problem solving capability of the best particle. Further, the particles remember all or at least a few traits of the best particle and tries to imitate the behavior of the best particle with some confidence. Imitation is an important aspect of social learning. If a particle is capable of carrying out observed behavior of the best particle to achieve the desired result, then the particle starts imitating the best particle. However, the particle may or may not be able to completely imitate the observed behavior. Therefore, each particle may have different states and solving values.

The imitation technique increases the similarity between the respective particles of the non-similar group and the best particle. The increase in similarity between said particles and the best particle is representative of increase in the solving value of the respective particles of the non-similar particle group.

As described above, the particle update unit 114, receives the datatype associated with each particle of the non-similar particle group and the datatype associated with the best particle from the classification unit 112. The particle update unit 114, further processes the received datatypes by applying imitation technique to update the particles in the non-similar particle group. In an exemplary embodiment of the present invention, the datatype is a matrix.

The updating of particles of the non-similar particle group by applying the imitation technique is exemplified by using the engineering design problem as follows:

$$B1 \text{ (generated from best particle } (r1, h1)) = \begin{bmatrix} 1 & r1 \\ 2 & h1 \end{bmatrix}$$

Further, for instance particle (r2,h2) is categorized into non-similar particle group, $$A1 \text{ (generated from particle } (r2, h2) = \begin{bmatrix} 1 & r2 \\ 2 & h2 \end{bmatrix}$$

The particle update unit 114, evaluates the respective mean vectors of the datatypes associated with the particles of the non-similar particle group and the datatype associated with the best particle. For instance in the engineering design problem, the particle update unit 114, evaluates the respective mean vectors of the matrices B1 and A1.

Mean B1=[1.5 r1+h1/2]

Mean A1=[1.5 r2+h2/2]

Further, the particle update unit 114, evaluates the mean difference of the respective mean vector matrices associated with particles of the non-similar particle group from the mean vector matrix associated with the best particle. For example the mean difference of the mean vectors of matrices B1 and A1 is evaluated, as follows:

Mean Difference $(D)$ = Mean $B1$ – Mean $A1$ =

$[x, y]$ (here $x$, $y$ denotes a value, $x$ is 0 in all cases)

The particle update unit 114 updates each element of the matrix associated with the respective particles of the non-similar particle group by adding Mean difference (D) of respective mean vector matrices and the mean vector matrix associated with the best particle.

For example: A1[r]=[1 r2]
A1[row 1][column1]=1
A1[row 1][column2]=r2

The matrix associated with particle A1 is updated by adding Mean difference (D) between the mean vector associated with the best particle (r1,h1) and the mean vector associated with particle (r2,h2) as exemplified below:

Updated $A1$ [$row1$] [$column1$] = $A1$ [row 1] [$column1$] + $D$ [$column1$]
$= 1 + x$ Updated $A1$ [$row1$] [$column2$] = $A1$ [$row1$] [$column2$] + $D$ [$column2$]
$= r2 + y$ Similarly,
Updated A1[row 2][column1]=2+x
Updated A1[row 2][column2]=h2+y Finally, the updated matrix A1, herein after referred to as P is as follows:

$$P \text{ (updated matrix } A1) = \begin{bmatrix} 1 & r2+y \\ 2 & h2+y \end{bmatrix}$$

The updated particle (r2,h2)=(r2+y, h2+y)

The particle update unit 114, further evaluates the Mahalanobis Distance (MD) between each updated particle and the best particle. For instance, the particle update unit 114, evaluates Mahalanobis Distance (MD) between the updated particle (r2, h2) and the best particle (r1, h1). Further, the particle update unit 114 invokes the particle generation unit 108 to randomly generate a new particle for each of the updated particles using sub-random sequences. For instance: Particle C is generated in the above example.

Further, the particle update unit 114, evaluates the Mahalanobis Distance (MD) between the particle C and the best particle (r1, h1). Yet further, the particle update unit 114, performs a check to determine if MD-C is less than MD-updated particle (r2, h2) and ensure that the updated particle is more similar to the best particle than a randomly generated particle. If MD-C is less than MD-updated particle (r2, h2), the particle update unit 114 replaces the updated particle (r2, h2) with the randomly generated particle C for further processing. Further, this improves the exploration capability of the optimization engine 102.

The particle update unit 114, updates each particle in the non-similar particle group as exemplified above. Furthermore, the particle update unit 114 accordingly updates the generated population of particles with the updated particles of the non-similar particle group and the randomly generated particles.

Further, the evaluation and broadcasting unit 110 is configured to receive the updated population from the particle update unit 114. The evaluation and broadcasting unit 110, further evaluates new best particle from the updated population of particles based on the second set of rules. Further, the information with respect to the best particle is broadcasted to all other particles in the updated population of particles.

Yet further, the evaluation and broadcasting unit 110 is configured to perform a check if target conditions are fulfilled via the condition analysis unit 116. The condition analysis unit 116 retrieves a set of predetermined conditions from the database 118. Further, the condition analysis unit 116 performs a check to determine if one of the conditions from a set of target conditions has been achieved. In an exemplary embodiment of the present invention, the set of conditions includes achieving a particular solving value for the optimization problem, (or) max-iterations for a preset value (k) for updating the particles of non-similar group (or) continuous improvements in the updated particle for preset value(r) (or) no improvement for a preset value (s). The values of k, r, and s may be any integer value based on the optimization problem to be solved.

Further, if it is determined that at least one of the target conditions has been achieved, the best particle is determined. In an exemplary embodiment of the present invention, the particle with the highest solving value in the last updated population of particles is selected as the final best particle.

Yet further, if it is determined that none of the target conditions have been fulfilled, the evaluation and broadcasting unit 110 invokes the classification unit 112 and the process continues until one of the target conditions is fulfilled.

Figure 2:
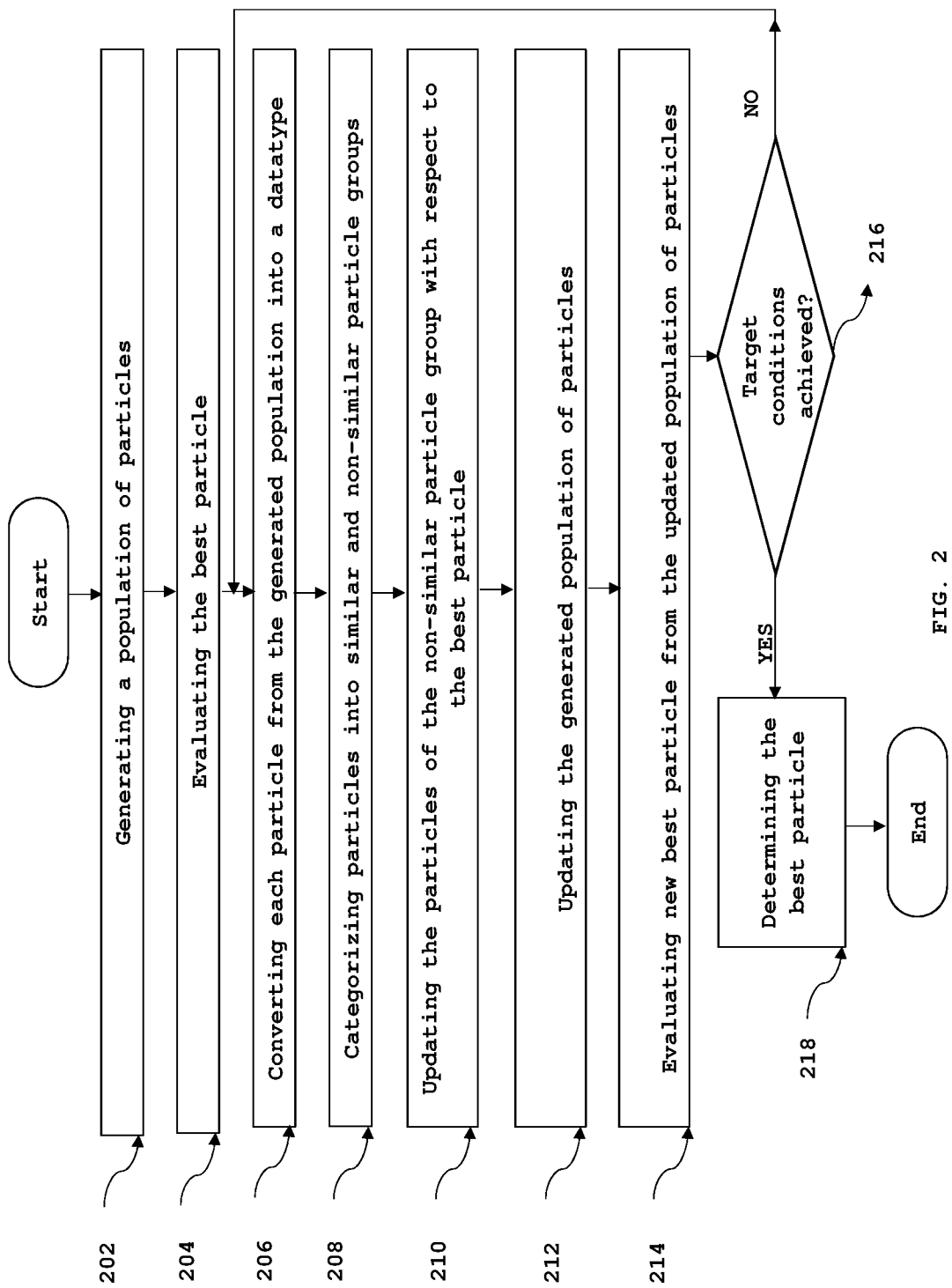
FIG. 2 is a flowchart illustrating a method for determining an optimal solution to an optimization problem in a swarm of candidate solutions, in accordance with various embodiments of the present invention.

FIG. 2 is a flowchart illustrating a method for determining an optimal solution to an optimization problem from a swarm of candidate solutions, in accordance with various embodiments of the present invention.

At step 202, a population of particles is generated. In an embodiment of the present invention, an optimization problem is received and a population of particles is generated in a search-space based on a first set of rules, wherein each particle is representative of a candidate solution. Each optimization problem is associated with a set of conditions which must be satisfied to solve the optimization problem. In an exemplary embodiment of the present invention, the first set of rule comprises, generating a population of particles which satisfy the conditions associated with the optimization problem to solve said problem with certain capability. Each particle has some random position in the search-space and has some level of capability to solve the optimization problem. The capability to solve the problem is hereinafter referred to as solving value.

In an exemplary embodiment of the present invention, the optimization problem is related to the field of engineering design. For instance the problem pertains to evaluating optimal proportions of a can. A cylindrical can of a given volume V0 is to be proportioned subject to the following condition: the total cost of the material in a box of 12 cans, arranged in a 3×4 pattern should be minimized. Further, r≥0, h≥0, 8r≤D0, 6r≤D0, h≤D0, πr2 h=V0, where r denotes radius of a can, and h denotes height of the can.

The cost expression takes the form z1S1+z2S2, where S1 is the surface area of the 12 cans and S2 is the surface area of the box. The coefficients z1 and z2 are positive and are generated based on the desired end product, such as cost, weight, speed, bandwidth, reliability etc. For instance, if the end user requirement is the cost then z1 and z2 represent the cost of the material per unit area. Further, a secondary condition is that no dimension of the box can exceed a given amount D0.

In this exemplary embodiment of the present invention, the design parameters r and h are identified from the optimization problem, where r denotes radius of a can, and h denotes height of the can.

Further, the available design solutions are identified as a set consisting of all pairs of (r, h) that satisfy the following conditions associated with the optimization problem:

r≥0, h≥0, 8≤D0, 6r≤D0, h≥F0, πr2 h=V0

A population of particles (r, h) as shown below, satisfying the conditions as mentioned above is generated.

$$\text{population of random particles} = \begin{bmatrix} r1 & h1 \\ r2 & h2 \\ r3 & h3 \\ \ldots \\ \ldots \\ rn & hn \end{bmatrix}$$

At step 204, best particle is evaluated. In an embodiment of the present invention, the best particle is evaluated from the generated population of particles based on a second set of rules. The best particle is representative of an optimal solution. In an exemplary embodiment of the present invention, the second set of rules comprises evaluating and analyzing the solving value of each particle in the population and selecting the particle with the highest solving value as the best particle. Further, the information with respect to the best particle is broadcasted to all other particles in the population.

For instance in the engineering design problem, the particles which provide minimum total cost of the material in a box of 12 cans, arranged in a 3×4 pattern are evaluated, as exemplified below:

f0 (r, h)=z1 [24πr(r+h)]+z2 [4r(24r+7h)], where f0(r, h) is a function denoting total cost. In an exemplary embodiment of the present invention, z1=1 and z2=2, (r1,h1)=(4,5) and (r2,h2)=(5,6)

f0(r1,h1)=6904.96 and f0(r2,h2)=10624.80

The particle which provides minimum value of the function f0 (r, h) is selected as the best particle. Further, the particle which provides minimum value of the function f0 (r, h) has the highest solving value. Therefore, r1, h1 is selected as the best particle.

At step 206, each particle from the generated population is converted into a datatype. In an exemplary embodiment of the present invention, each particle from the generated population is converted into a datatype compatible for further processing by one or more multivariate measurement techniques and the imitation technique. In an embodiment of the present invention, the data type is a matrix. Generation of matrix depends on the optimization problem. For example if the solution for a problem consists of only one variable then the first column is generated as a constant value in all the matrices and the generated random solutions are selected as the second column. For instance: {((1, a1), (2, a2), (3, a3) . . . } where [a1, a2, a3 . . . ] represent solutions for a given problem. The first column in all the matrices are sequential integers 1, 2 . . . n. In various embodiments of the present invention, the number of rows in the matrix increases with increase in the number of variables.

In the exemplary embodiment of the present invention, as discussed above the optimization problem is related to the field of engineering design and has two variables r and h.

The population of particles generated at step 202 is as follows:

$$\text{population of random particles} = \begin{bmatrix} r1 & h1 \\ r2 & h2 \\ r3 & h3 \\ \ldots \\ \ldots \\ rn & hn \end{bmatrix}$$

The particle (r1, h1) is evaluated as the best particle.

A matrix B1 from the selected best particle (r1, h1) is generated, as shown below:

$$B1 = \begin{bmatrix} 1 & r1 \\ 2 & h1 \end{bmatrix}$$

Further, each particle is selected one by one, either randomly or in the order of their solving capability and respective matrices are generated. For example, matrix A1 is generated from particle (r2,h2) as shown below:

$$A1 = \begin{bmatrix} 1 & r_2 \\ 2 & h_2 \end{bmatrix}$$

At step 208, particles are categorized into similar and non-similar particle groups. In an exemplary embodiment of the present invention, the generated population of particles are categorized into similar and non-similar particle groups based on the similarity with the best particle by applying one or more multivariate measurement techniques. The examples of multivariate measurement techniques include but are not limited to Mahalanobis Distance (MD) and Euclidean distance techniques. In an exemplary embodiment of the present invention, the multivariate measurement technique is Mahalanobis.

The evaluation of similarity between a particle and the best particle is expressed in terms of Mahalanobis Distance (MD). Greater the value of Mahalanobis Distance (MD) between a particle and the best particle lesser is the similarity and the particle is grouped into non-similar particle group. Further, lesser is the value of Mahalanobis Distance between a particle and the best particle, greater is the similarity and the particle is grouped into similar particle group. The MD value is evaluated as exemplified below:

The mean vectors of the generated matrices are evaluated. For instance, mean vectors Mean (A1) and Mean (B1) of the matrices A1 and B1 are respectively generated.

Further, the centered data of the generated matrices is evaluated. For instance, centered data matrices A' and B' of the matrices A1 and B1 are respectively generated as exemplified below:

A'=A1−Mean (A1)
B'=B1−Mean (B1)

Yet further, the covariance matrices for the generated centered data matrices are evaluated. For instance covariance matrices C1 and C2 are generated for centered data matrices A' and B' respectively, as exemplified below:

$$C1 = \frac{1}{n1} * (A')^T * (A')$$

$$C2 = \frac{1}{n2} * (B')^T * (B')$$

where C1 and C2 are the covariance matrices evaluated from the matrices A' and B' respectively, n1 and n2 are the number of rows in the matrices A' and B' respectively.

Further, the pooled covariance matrix of C1 and C2 is evaluated, as exemplified below:

$$PC = \frac{1}{n1+n2}[n1*c1 + n2*c2]$$

Further, the mean difference matrix of matrices A1 and B1 is evaluated, as exemplified below:

$$B1 = \begin{bmatrix} 1 & r1 \\ 2 & h1 \end{bmatrix}, \text{Mean } B1 = [1.5 \quad r1 + h1/2]$$

$$A1 = \begin{bmatrix} 1 & r2 \\ 2 & h2 \end{bmatrix}, \text{Mean } A1 = [1.5 \quad r2 + h2/2]$$

Mean Difference=Mean B1−Mean A1=[x, y] (where x=0 and y has some value]

Finally, the Mahalanobis Distance (MD) is evaluated as a function of pooled covariance matrix and mean difference, as exemplified below:

$$MD = \begin{cases} \sqrt{\text{Mean Difference} * PC^{-1} * \text{Mean Difference}^T} & \text{if inverse of } PC \text{ is possible} \\ 1 & \text{Otherwise} \end{cases}$$

For instance in the engineering design problem $$B1 \text{ (generated from best particle } (r1, h1)) = \begin{bmatrix} 1 & r1 \\ 2 & h1 \end{bmatrix}$$

$$A1 \text{ (generated from particle } (r2, h2) = \begin{bmatrix} 1 & r_2 \\ 2 & h_2 \end{bmatrix}$$

The Mahalnobis distance between A1 and B1 is evaluated. If the distance is less than desired similarity value (γ), then A1 is added to the similar particle group else A1 is added to the non-similar particle group. In an exemplary embodiment of the present invention, γ<0.5, however γ may vary depending on the level of similarity desired. Further, the Mahalanobis Distance (MD) for all the other particles in the generated population is evaluated and the particles are categorized into similar and non-similar particle groups.

At step 210, the particles of the non-similar particle group are updated with respect to the best particle. In an exemplary embodiment of the present invention, each particle of the non-similar particle group is updated with respect to the best particle by applying an imitation technique. In various embodiments of the present invention, the imitation technique is based on the human behavior of learning and imitating to solve complex problems. The best particle is representative of a leader and the non-similar particles are representative of followers. The leader who has achieved good position in a society serves as an energizing force with associated position and collected experience to solve a problem. Complex problems can be solved with the influence of traits from one person to other or from one group to other groups in the society. It has been observed that human beings are great imitators or followers in solving any task. Group solving capability has emerged to be more effective than individual capability in exploiting and exploring different traits of each individual in the group to solve a given problem. The leader influences the others in processing critical situations. A leader's view of a complex situation can affect the way to move forward for the followers. In particular, if a particular state of a particle is being rewarded then the movements of other particles are indirectly reinforced to imitate the state of the particle being rewarded. The other particles in the swarm starts imitating the best particle due to the problem solving capability of the best particle. Further, the particles remember all or at least a few traits of the best particle and tries to imitate the behavior of the best particle with some confidence. Imitation is an important aspect of social learning. If a particle is capable of carrying out observed behavior of the best particle to achieve the desired result, then the particle starts imitating the best particle. However, the particle may or may not be able to completely imitate the observed behavior. Therefore, each particle may have different states and solving values.

The imitation technique increases the similarity between the respective particles of the non-similar group and the best particle. The increase in similarity between said particles and the best particle is representative of increase in the solving value of the respective particles of the non-similar particle group.

The datatype associated with each particle of the non-similar particle group and the datatype associated with the best particle are processed by applying imitation technique to update the particles in the non-similar particle group. In an exemplary embodiment of the present invention, the datatype is a matrix.

The updating of particles of the non-similar particle group by applying the imitation technique is exemplified by using the engineering design problem as follows:

$$B1 \text{ (generated from best particle } (r1, h1)) = \begin{bmatrix} 1 & r1 \\ 2 & h1 \end{bmatrix}$$

Further, for instance particle (r2,h2) is categorized into non-similar particle group, $$A1 \left( \text{generated from particle } (r2, h2) = \begin{bmatrix} 1 & r2 \\ 2 & h2 \end{bmatrix} \right)$$

The respective mean vectors of the matrices B1 and A1 are evaluated, as shown below:

Mean B1=[1.5r1+h1/2]

Mean A1=[1.5r2+h2/2]

Further, the mean difference of the mean vectors of matrices B1 and A1 is evaluated, as follows:

$$\text{Mean Difference}(D) = \text{Mean } B1 - \text{Mean } A1$$
$$= [x\ y] \text{ (here } x, y \text{ denotes a value,}$$
$$x \text{ is 0 in all cases)}$$

Each element of the matrix associated with the respective particles of the non-similar particle group is updated by adding Mean difference (D) of respective mean vector matrices and the mean vector matrix associated with the best particle.

For example: A1[r]=[1r2]
A1[row 1][column1]=1
A1[row 1][column2]=r2

The matrix associated with particle A1 is updated by adding Mean difference (D) between the mean vector associated with the best particle (r1,h1) and the mean vector associated with particle (r2,h2) as exemplified below:

$$\text{Updated } A1\ [row1]\ [column1] = A1\ [row\ 1]\ [column1] + D\ [column1]$$
$$= 1 + x$$

$$\text{Updated } A1\ [row1]\ [column2] = A1\ [row1]\ [column2] + D\ [column2]$$
$$= r2 + y$$

Similarly,
Updated A1[row 2][column1]=2+x
Updated A1[row 2][column2]=h2+y

Finally, the updated matrix Al, herein after referred to as P is as follows:

$$P(\text{updated matrix } A1) = \begin{bmatrix} 1 & r2+y \\ 2 & h2+y \end{bmatrix}$$

The updated particle (r2,h2)=(r2+y, h2+y)

Further, the Mahalanobis Distance (MD) between the updated particle (r2, h2) and the best particle (r1, h1) is evaluated. A new particle C is generated using sub-random sequences. Further, the Mahalanobis Distance (MD) between the new particle C and the best particle (r1, h1) is evaluated. Yet further, a check is performed to determine if MD-C is less than MD-updated (r2, h2). If MD-C is less than MD-updated particle (r2, h2), replacing the updated particle (r2, h2) with the randomly generated particle C for further processing. Each particle in the non-similar particle group is updated as exemplified above.

At step 212, the generated population of particles is updated with one or more updated particles of the non-similar particle group and the one or more randomly generated particles.

At step 214, new best particle is evaluated from the updated population of particles. In an exemplary embodiment of the present invention, a new best particle is evaluated from the updated population of particles based on a second set of rules. In an exemplary embodiment of the present invention, the second set of rules comprises evaluating and analyzing the solving value of each particle in the population and selecting the particle with the highest solving value as the best particle. Further, the information with respect to the best particle is broadcasted to all other particles in the updated population of particles.

At step 216, a check is performed to determine if one of the conditions from a set of target conditions has been achieved. In an exemplary embodiment of the present invention, the set of conditions includes achieving a particular solving value for the optimization problem, max-iterations for a preset value (k) for updating the particles of non-similar group, continuous improvements in the updated particle for preset value(r), no improvement for a preset value (s). The values of k, r, and s may be any integer value based on the optimization problem to be solved. The values of k, r, and s may be any integer value based on the optimization problem to be solved. Further, if it is determined that none of the target conditions have been achieved, steps 206, 208, 210, 212 and 214 are repeated in their respective order.

At step 218, if it is determined that at least one of the target conditions has been achieved, the best particle is determined. In an exemplary embodiment of the present invention, the particle with the highest solving value in the last updated population of particles is selected as final best particle.

Figure 3:
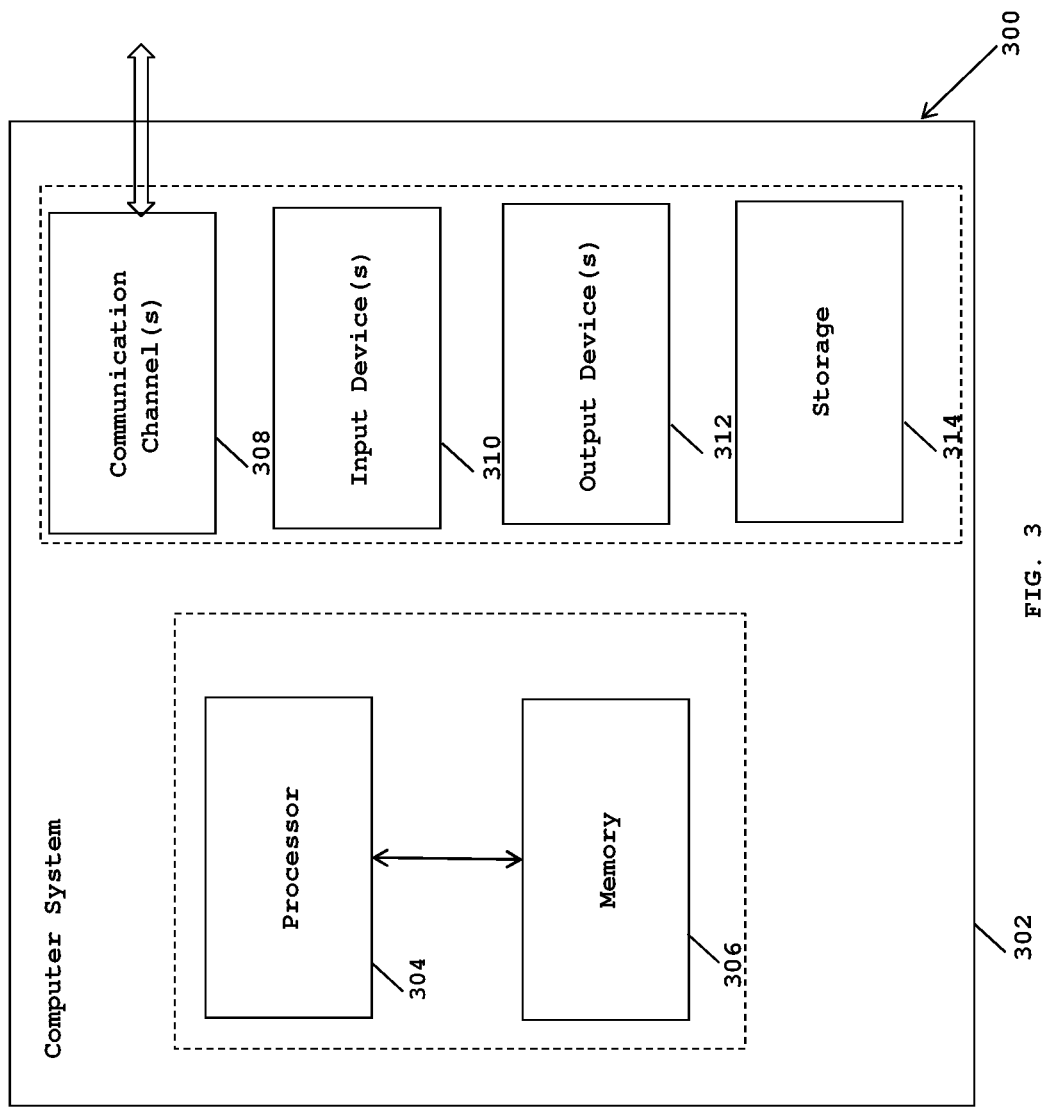
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for determining an optimal solution to an optimization problem from a swarm of candidate solutions, performed by an optimization engine, the optimization engine executing instructions stored in a memory via a processor, said method comprising:
   a) generating, by the optimization engine, a population of particles in a search-space for an optimization problem based on a first set of rules, wherein each particle is representative of a candidate solution;
   b) evaluating, by the optimization engine, a best particle from the generated population of particles based on a second set of rules, wherein the best particle is representative of an optimal solution;
   c) converting, by the optimization engine, each particle from the generated population into a datatype compatible for further processing by one or more multivariate measurement techniques and an imitation technique, wherein the datatype is a matrix and generation of the matrix associated with a particle of the generated population comprises: evaluating a number of variables in the particle of the generated population; evaluating dimensions of the matrix based on the number of variables, wherein number of rows of the matrix is equivalent to the number of variables; generating a constant value for first column based on the dimensions of the matrix, wherein the constant values are sequential integers; and selecting the variables of the particle as a second column of the matrix;
   d) categorizing, by the optimization engine, the generated population of particles into similar and non-similar particle groups based on similarity with the best particle by applying one or more multivariate measurement techniques on the converted compatible datatype;
   e) updating, by the optimization engine, each particle of the non-similar particle group with respect to the best particle by applying the imitation technique;
   f) updating, by the optimization engine, the generated population of particles with at least one of: one or more updated particles of the non-similar particle group and one or more randomly generated new particles, wherein any one or more of the updated particles is replaced with respective randomly generated new particles if a degree of similarity of the any one or more of the updated particles in relation to the best particle is less than the respective randomly generated new particles;
   g) evaluating, by the optimization engine, a new best particle from updated population of particles based on the second set of rules;
   h) determining, by the optimization engine, if at least one condition from a set of target-conditions has been achieved and selecting the particle with highest solving value in last updated population of particles as final best particle; and
   i) repeating steps c,d,e,f,g, and h until at least one of the target conditions are achieved.

2. The method as claimed in claim 1, wherein the first set of rules comprises generating a population of particles which satisfy a set of conditions associated with the optimization problem to solve said problem with certain capability, wherein the capability to solve the problem is representative of a solving value.

3. The method as claimed in claim 2, wherein the second set of rules comprises evaluating and analyzing the solving value of each particle in the population and selecting the particle with the highest solving value as the best particle.

4. The method as claimed in claim 1, wherein the multivariate measurement technique is Mahalanobis and categorizing the generated population of particles into similar and non-similar particle groups based on similarity with the best particle comprises:
   adding the particles to the similar particle group if the Mahalanobis distance between the particles and the best particle is less than a desired similarity value $\gamma$; and
   adding the particles to the non-similar particle group if the Mahalanobis distance between the particles and the best particle is more than the desired similarity value $\gamma$.

5. The method as claimed in claim 4, wherein updating the particle of the non-similar particle group in relation to the best particle by applying the imitation technique comprises:
   evaluating a mean vector of matrix associated with the particle of the non-similar particle group and the matrix associated with the best particle;
   evaluating a mean difference between the mean vector matrix associated with said particle and the mean vector matrix associated with the best particle;
   updating each element of the matrix associated with the particle of the non-similar particle group by adding mean difference (D) between the mean vector matrix associated with the particle and the mean vector matrix associated with the best particle; and evaluating the updated particle as the elements of the second column of updated matrix.

6. The method as claimed in claim 1, wherein updating the population of particles comprises:

evaluating the Mahalanobis Distance (MD) between the randomly generated new particle and the best particle;

determining if MD-new particle is less than MD-updated particle; and replacing the updated particle with the randomly generated new particle for updating the population of particles if MD-new particle is less than MD-updated particle.

7. The method as claimed in claim 6, wherein if MD-new particle is greater than MD-updated particle, updating the population of particles with the updated particle and rejecting the randomly generated new particle.

8. The method as claimed in claim 1, wherein the set of target conditions includes achieving a particular solving value for the optimization problem, max-iterations for a preset value (k) for updating the particles of non-similar group, continuous improvements in the updated particle for a preset value (r) and no improvement for a preset value (s), wherein k, r, and s are integers.

9. An optimization system for determining an optimal solution to an optimization problem in a swarm of candidate solutions, the optimization system comprising:

a memory storing program instructions; a processor configured to execute program instructions stored in the memory; and an optimization engine in communication with the processor and configured to:

a) generate a population of particles in a search-space for an optimization problem based on a first set of rules, wherein each particle is representative of a candidate solution;

b) evaluate a best particle from the generated population of random particles based on a second set of rules, wherein the best particle is representative of an optimal solution;

c) convert each particle from the generated population into a datatype compatible for further processing by one or more multivariate measurement techniques and an imitation technique, wherein the datatype is a matrix and generation of the matrix associated with a particle of the generated population comprises: evaluating a number of variables in the particle of the generated population; evaluating dimensions of the matrix based on the number of variables, wherein number of rows of the matrix is equivalent to the number of variables; generating a constant value for first column based on the dimensions of the matrix, wherein the constant values are sequential integers; and selecting the variables of the particle as a second column of the matrix;

d) categorize the generated population of particles into similar and non-similar particle groups based on a similarity with the best particle by applying one or more multivariate measurement techniques on the converted compatible datatype;

e) update each particle of the non-similar particle group with respect to the best particle by applying the imitation technique;

f) update the generated population of particles with at least one of: one or more updated particles of the non-similar particle group and one or more randomly generated new particles, wherein any one or more of the updated particles is replaced with respective randomly generated new particles if a degree of similarity of the any one or more of the updated particles in relation to the best particle is less than the respective randomly generated new particles;

g) evaluate a new best particle from updated population of particles based on the second set of rules;

h) determine if at least one condition from a set of target conditions has been achieved and select the particle with highest solving value in last updated population of particles as final best particle; and i) repeat steps c,d,e,f,g and h until at least one of the target conditions are achieved.

10. The system as claimed in claim 9, wherein the optimization engine comprises a particle generation unit in communication with the processor, said particle generation unit is configured to generate the population of particles in the search-space from the optimization problem based on the first set of rules, wherein each particle is representative of the candidate solution and each optimization problem is associated with a set of conditions to be achieved for solving the optimization problem.

11. The system as claimed in claim 9, wherein the first set of rules comprises generating a population of random particles which satisfy a set of conditions associated with the optimization problem to solve said problem with certain capability, wherein the capability to solve the problem is representative of a solving value.

12. The system as claimed in claim 9, wherein the optimization engine comprises an evaluation and broadcasting unit in communication with the processor, said evaluation and broadcasting unit is configured to:

evaluate the best particle from the generated population of particles based on the second set of rules, wherein the best particle is representative of the optimal solution; and broadcast the information with respect to the best particle to all other particles in the population.

13. The system as claimed in claim 12, wherein the second set of rules comprises evaluating and analyzing solving value of each particle in the population and selecting the particle with the highest solving value as the best particle.

14. The system as claimed in claim 9, wherein the optimization engine comprises a classification unit in communication with the processor, said classification unit is configured to:

convert each particle from the generated population into the datatype compatible for further processing by one or more multivariate measurement techniques and the imitation technique, wherein the datatype is a matrix; and categorize the generated population of particles into similar and non-similar particle groups based on the similarity with the best particle by applying one or more multivariate measurement techniques.

15. The system as claimed in claim 14, wherein the multivariate measurement technique is Mahalanobis and categorizing the generated population of particles into similar and non-similar particle groups based on the similarity with the best particle comprises:

adding particles to the similar particle group if the Mahalanobis distance between the particles and the best particle is less than a desired similarity value $\gamma$; and adding the particles to the non-similar particle group if the Mahalanobis distance between the particles and the best particle is more than the desired similarity value $\gamma$.

16. The system as claimed in claim 9, wherein the optimization engine comprises a particle update unit in communication with the processor, said particle update unit is configured to:
   update each particle of the non-similar particle group with respect to the best particle by applying the imitation technique; and
   update the generated population of particles.

17. The system as claimed in claim 16, wherein updating a particle of the non-similar particle group in relation to the best particle by applying the imitation technique comprises:
   evaluating a mean vector of the matrix associated with the particle of non-similar particle group and the matrix associated with the best particle;
   evaluating a mean difference between the mean vector matrix associated with said particle and the mean vector matrix associated with the best particle;
   updating each element of the matrix associated with the particle of the non-similar particle group by adding Mean difference (D) between the mean vector matrix associated with the particle and the mean vector matrix associated with the best particle; and
   evaluating the updated particle as the elements of the second column of the updated matrix.

18. The system as claimed in claim 16, wherein updating the population of particles comprises:
   evaluating the Mahalanobis Distance (MD) between the randomly generated new particle and the best particle;
   determining if MD-new particle is less than MD-updated particle; and
   replacing the updated particle with the randomly generated new particle for updating the population of particles if MD-new particle is less than MD-updated particle.

19. The system as claimed in claim 18, wherein if MD-new particle is greater than MD-updated particle, update the population of particles with the updated particle and rejecting the randomly generated new particle.

20. The system as claimed in claim 9, wherein the optimization engine comprises a condition analysis unit in communication with the processor, said condition analysis unit is configured to:
   retrieve the set of target-conditions from a database; and
   determine if at least one condition from the set of target conditions has been achieved.

21. The system as claimed in claim 9, wherein the set of target conditions includes achieving a particular solving value for the optimization problem, max-iterations for a preset value (k) for updating the particles of non-similar group, continuous improvements in the updated particle for a preset value (r) and no improvement for a preset value (s), wherein k, r, and s are integers.

22. A computer program product comprising:
   a non-transitory computer-readable medium having computer-readable program code stored thereon, the computer-readable program code comprising instructions that, when executed by a processor, cause the processor to:
   a) generate a population of particles in a search-space for an optimization problem based on a first set of rules, wherein each particle is representative of a candidate solution;
   b) evaluate a best particle from the generated population of random particles based on a second set of rules, wherein the best particle is representative of an optimal solution;
   c) convert each particle from the generated population into a datatype compatible for further processing by one or more multivariate measurement techniques and an imitation technique, wherein the datatype is a matrix and generation of the matrix associated with a particle of the generated population comprises: evaluating a number of variables in the particle of the generated population; evaluating dimensions of the matrix based on the number of variables, wherein number of rows of the matrix is equivalent to the number of variables; generating a constant value for first column based on the dimensions of the matrix, wherein the constant values are sequential integers; and selecting the variables of the particle as a second column of the matrix;
   d) categorize the generated population of particles into similar and non-similar particle groups based on a similarity with the best particle by applying one or more multivariate measurement techniques on the converted compatible datatype;
   e) update each particle of the non-similar particle group with respect to the best particle by applying an imitation technique;
   f) update the generated population of particles with at least one of: one or more updated particles of the non-similar particle group and one or more randomly generated new particles, wherein any one or more of the updated particles is replaced with respective randomly generated new particles if a degree of similarity of the any one or more of the updated particles in relation to the best particle is less than the respective randomly generated new particles;
   g) evaluate a new best particle from updated population of particles based on the second set of rules;
   h) determine if at least one condition from a set of target conditions has been achieved and select the particle with the highest solving value in last updated population of particles as final best particle; and
   i) repeat steps c,d,e,f,g and h until at least one of the target conditions are achieved.

23. The system as claimed in claim 22, wherein the set of target conditions includes achieving a particular solving value for the optimization problem, max-iterations for a preset value (k) for updating the particles of non-similar group, continuous improvements in the updated particle for a preset value (r) and no improvement for a preset value (s).

* * * * *